ADJUSTABLE HEAD WHEEL PANEL FOR VIDEO TAPE RECORDERS

Filed Sept. 12, 1960 5 Sheets-Sheet 1

Inventor:
Rudolf Prochnow
By Michael S. Striker
Attorney

Jan. 4, 1966 R. PROCHNOW 3,227,815

ADJUSTABLE HEAD WHEEL PANEL FOR VIDEO TAPE RECORDERS

Filed Sept. 12, 1960 5 Sheets-Sheet 2

Inventor:
Rudolf Prochnow
By Michael S. Striker
Attorney

ADJUSTABLE HEAD WHEEL PANEL FOR VIDEO TAPE RECORDERS

Filed Sept. 12, 1960 5 Sheets-Sheet 3

Inventor:
Rudolf Prochnow
By Michael S. Striker
Attorney

Inventor:
Rudolf Prochnow
By Michael S. Striker
Attorney

ADJUSTABLE HEAD WHEEL PANEL FOR VIDEO TAPE RECORDERS

Filed Sept. 12, 1960 5 Sheets-Sheet 5

*Inventor:*
Rudolf Prochnow
By Michael S. Striker
Attorney

United States Patent Office 3,227,815
Patented Jan. 4, 1966

3,227,815
ADJUSTABLE HEAD WHEEL PANEL FOR VIDEO TAPE RECORDERS

Rudolf Prochnow, Darmstadt-Eberstadt, Germany, assignor to Fernseh G.m.b.H., Darmstadt, Germany Filed Sept. 12, 1960, Ser. No. 55,411
Claims priority, application Germany, Sept. 11, 1959, F 29,359
7 Claims. (Cl. 179—100.2)

The invention concerns an electromagnetic head assembly for video tape recorders with several magnetic heads arranged about the circumference of a rotary wheel so that the circular paths of said heads traverse the magnetic tape approximately transverse to its longitudinal direction, the magnetic tape being guided in cupped condition along a part of the circular paths of said heads. The invention results in improvements which make possible the attainment and maintenance of the necessary high accuracy, and also facilitate the production and alignment of the head carrying wheel. The invention also concerns measures for an unhindered tape rewind, as well as an improved form of the magnetic heads, especially of their pole shoes, and slip-ring arrangements for establishing circuits for the head currents.

In order to produce the high relative velocity between tape and head necessary for the recording or pickup of television signals on or from magnetic tape, respectively, it is already known to move the magnetic heads in a direction transverse of the longitudinal direction of the tape and to arrange them on the circumference of a head wheel which rotates at an appropriately high number of revolutions. The magnetic tape is then kept in cupped form by a concave guide arranged concentric with and along a part of the circumference of the head wheel. For continuous recording on the resulting transverse tracks several heads are therefore necessary, which are arranged at equal angular spacing about the circumference of the head wheel. Such an arrangement should meet very high standards of accuracy. The magnetic gaps of the various heads should lie exactly on one circumferential line of the head wheel, have equal distances in the radial direction from the axis of the head wheel and the angular spacing, e.g. 90° for four heads, must likewise be provided for with great accuracy. According to a known proposal the magnetic members of the heads are made mainly of ferrite, while the poles thereof are provided with pole shoes of an iron-aluminium alloy. The pole shoes have very small dimensions to match the track width of e.g. 0.25 mm. and have a thickness of e.g. 0.1 mm. Thus positioning these pole shoes is very difficult. In the known construction the magnetic heads are arranged in mountings which in turn are secured to the head wheel. In order that the heads may cooperate uniformly with the magnetic tape the latter is forced into a transversely cupped condition by a concave guide so that the radius of curvature of the cupped tape corresponds to the maximum radius of the wheel. In a known embodiment the tape is urged and held against the concave guide by air pressure, in that a vacuum is maintained along the surface of the guide. In order that the magnetic heads engage the tape uniformly during operation it is not only necessary that the outer radius of the head wheel and the radius of curvature of the guide agree with one another, but care must also be taken that the centre of curvature of the concave guide lies on the axis of rotation of the head wheel and that the guide is held by an appropriate means at an exactly maintained uniform distance from the path of the head tips. On the other hand it is necessary to withdraw the guide from the head wheel during threading of the tape and during the tape rewind. In a known arrangement the guide is carried for this purpose by a lever which is pivotable about an axis perpendicular to the axis of the head wheel. In this form of construction the guide is withdrawn only slightly (by about 2 mm.) from the head wheel. The tape therefore retains even during the rapid rewind the curvature enforced by the air pressure. In another known arrangement the guide moves about a relatively short pivot parallel to the head wheel axis. Therefore this construction does not possess the necessary accessibility and accuracy.

Therefore, it is an object of the invention to improve the construction of the head wheel and the mountings for the heads on the rotating head wheel.

A further object is the construction of the magnetic head itself.

Additonal objects of the invention will appear from the following description in conjunction with the accompanying drawings.

Referring to the drawings.

Figures 3, 3A:
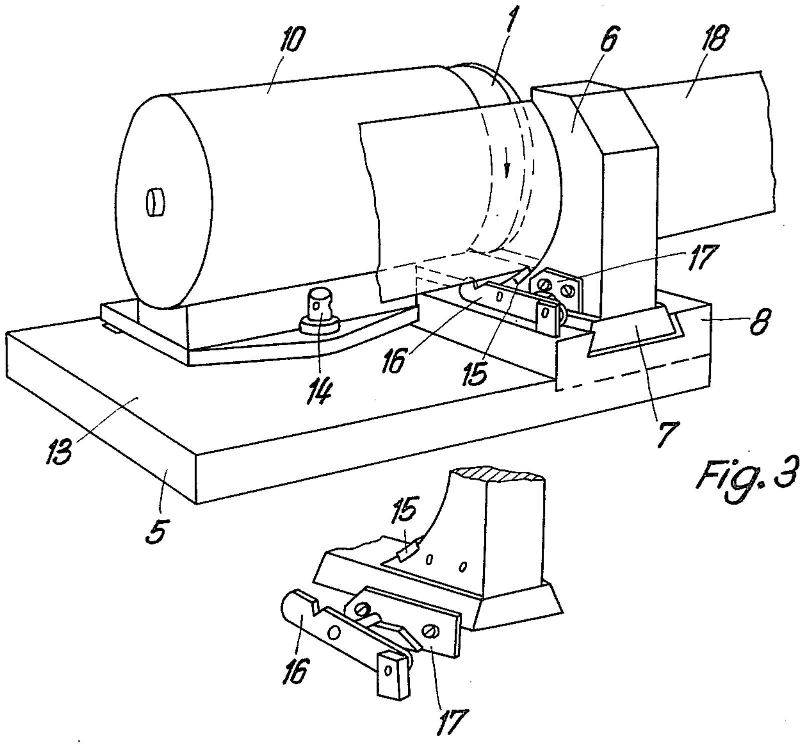
FIGURE 3 is a different view of the head wheel assembly of FIG. 1 illustrating improved details of the tape guide.

FIGURE 3*a* shows similarly in an exploded view member details of FIGURE 3.

Figure 4:
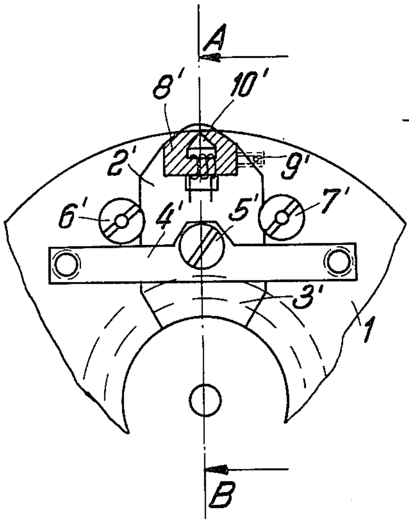

FIGURE 4 shows a portion of the head wheel with a magnetic head (emphasized by hatching) and its mounting in a view taken in direction of the axis.

Figure 4A:
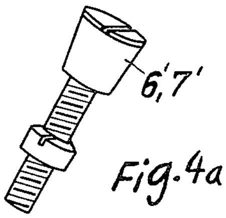

FIGURE 4*a* shows a screw member of FIGURE 4.

Figure 5:
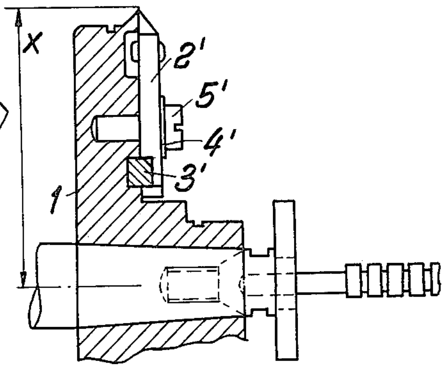

FIGURE 5 is a sectional elevation, the section being taken along line A—B of FIGURE 4.

Figure 6:
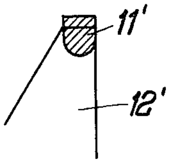
Figure 6A:
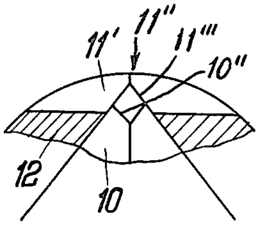

FIGURES 6 and 6*a* are enlarged illustrations in end and front view, respectively, of a head tip with pole pieces constructed in accordance with the invention.

Figure 7:
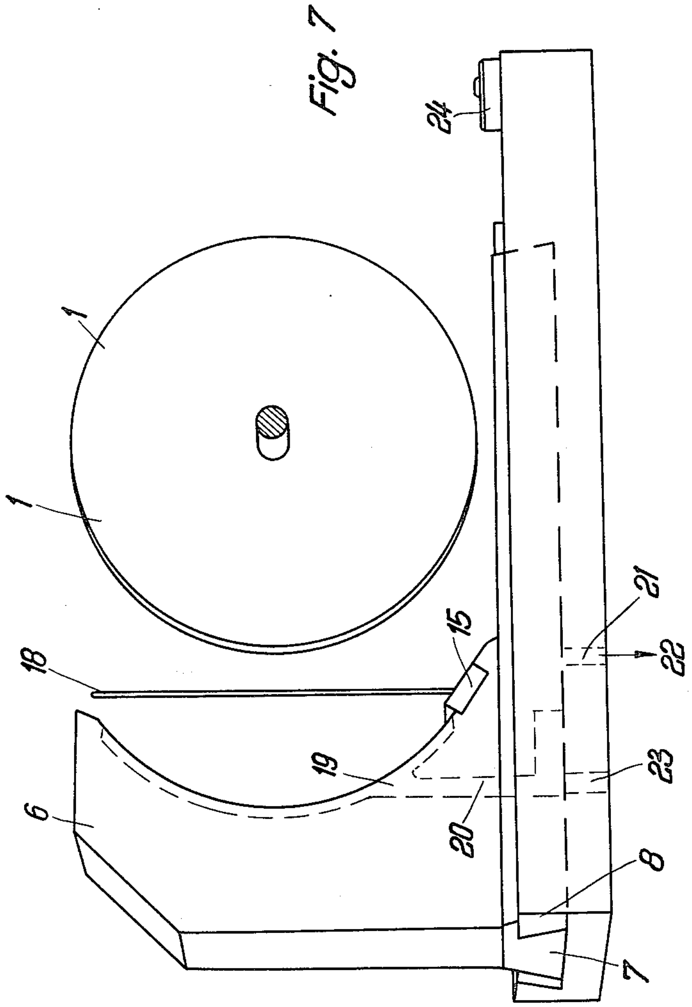

FIGURE 7 is a schematic illustration of the arrangement showing the mounting of the guide in accordance with the invention.

Figure 8:
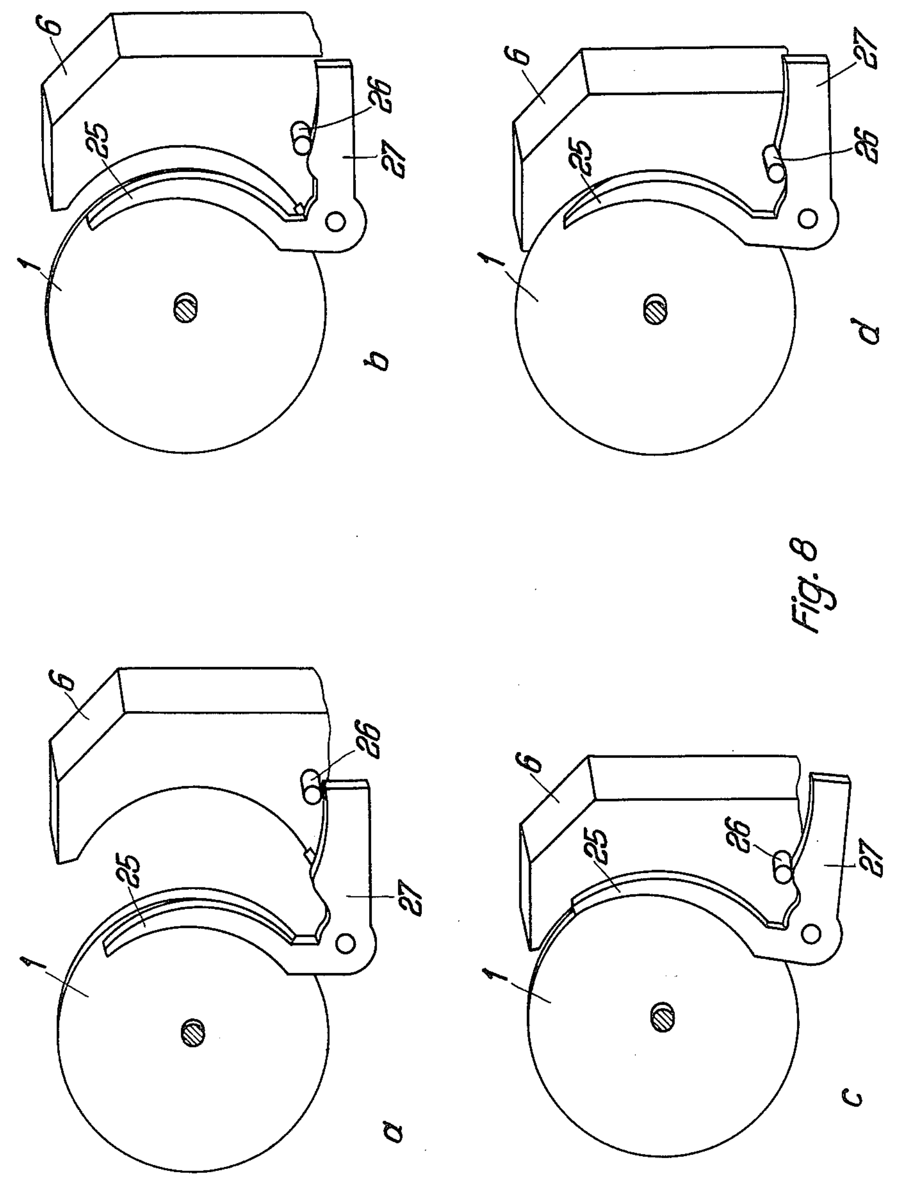

FIGURES 8, 8*a*, *b*, *c* and *d* show schematically a modification of the tape guide in various operational positions.

Figures 1, 2:
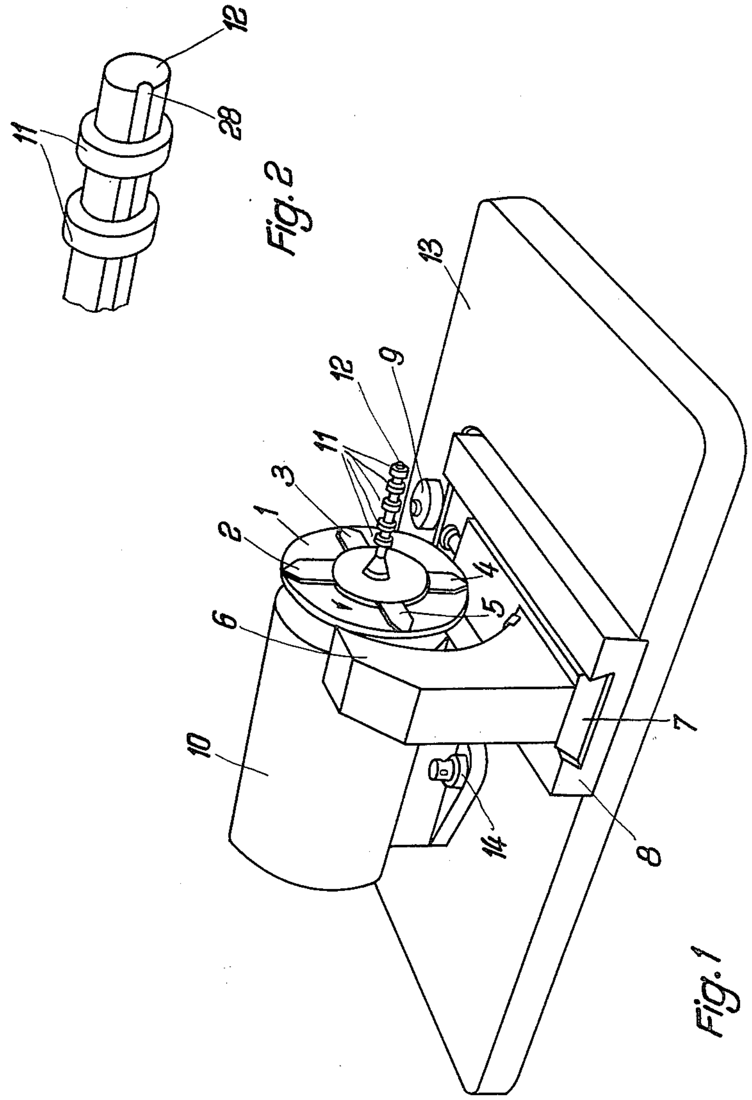
FIGURE 1 shows a general view of a head wheel assembly according to the invention.
FIGURE 2 is an enlarged illustration of a detail of FIG. 1, namely of the shaft carrying the slip-rings.

In FIGURE 1, 1 indicates the head wheel, which consists of non-magnetic material, e.g. brass. Around the circumference of the head wheel 1, the magnetic heads 2, 3, 4, 5 are mounted in the manner described further below.

The concave guide 6 for the magnetic tape is secured according to the invention to a slide 7 which is movable parallel with itself and in direction perpendicular to the axis of the head wheel 1. This arrangement ensures the concave guide 6 to be positioned in the working position rigidly and free of play and on the other hand makes it possible without injuriously affecting the accuracy to provide for a distance between head wheel 1 and guide 6 so great that during the rewind the tape no longer needs to be bent into cupped condition by the guide, but runs in flat shape freely between head wheel and guide.

The centre of curvature of the concave guide 6 should coincide exactly with the axis of the head wheel 1. In order that this condition be fulfilled even upon exchange of the head wheel, a possibility of adjusting the relative positions of centre of curvature and head wheel axis should be provided. Since in the form of construction described the guide 8 for the movable slide member 7 supporting concave guide 6 is rigidly connected with the baseplate 13 of the head wheel assembly, the necessary alignment is effected by adjusting the height of the head wheel axis. For this purpose the head wheel 1 is secured, together with the associated driving motor 10, to a plate which is hinged at one end to the base 13 and the free end of which may be raised or lowered by means of a fine adjustment screw 14.

The slip-rings 11 serving for feeding or delivering the head currents are disposed on a thin, freely projecting shaft 12 of insulating material and of small diameter. In order to avoid an undesired distortion of this shaft which rotates at a high number of revolutions it has been found advisable to make the shaft of ceramic material. The lead wires to the slip-rings can be placed in slots (28 in FIGURE 2), which are ground in the ceramic shaft.

FIGURE 3 shows another view of the head wheel assembly. In the area where the heads during rotation in direction of the arrow leave the tape 18, the concave guide 6 is provided with a guide-bar 15, with a guiding surface or edge extending in the direction of movement of the tape, so that the lower edge of the tape is urged against this guide surface under the influence of the frictional engagement of the heads with the tape. In order to ensure a trouble-free guiding engagement of the guide-bar edge with the lower edge of the tape when guide member 6 is moved into position, a lever 16 may be provided which is lifted when the concave guide carrying the cam plate 17 is moved and which engages with a notch 16' the tape edge end lifts the tape onto guide—bar 15.

In FIGURES 4 and 5, 1 indicates a portion of the head wheel. The magnetic heads spaced from each other along the circumference of the head wheel, one only of which is illustrated in FIGURE 4, are received each by a holder 2' of non-magnetic material, e.g. brass. The holder 2' is provided near its inner end with a turned arcuate groove with which it engages a ring 3' from one side. On the other side the ring 3' is firmly inserted in an annular turned groove 2'' in the head wheel 1. The holder 2' is urged by a clamping strip 4' against the surface of the head wheel 1 and fixed by a clamping screw 5'. After loosening the clamping screw 5' the relative angular spacing of the heads may be adjusted with high accuracy by means of two screws with conical heads 6' and 7' (FIG. 4*a*) e.g. by loosening the one and tightening the other. The outer surface of the ring 3' is bevelled, so that the holder 2' engages only with one edge of its groove the surface of the ring 3' which is closer to the axis. The advantage is thus obtained that in the process of setting the heads to the prescribed angular spacing the gaps of the individual heads are kept at the same radial distance from the axis.

In the holders 2' the distance from the groove edge engaging the ring 3' to the head tips is the reference distance to which each head with its holder is adjusted or held during manufacture. If the mounting surface for the magnetic head on the holder 2' is machined in a jig which is provided with a concentric guide member equal to ring 3' engaging the groove in the holder 2', then it is possible to obtain an exact radial position of the gap at the tip of the head, which is still maintained correct during angular adjustment of the heads.

The manufacture and machining of the magnetic heads is commenced from the turned arcuate groove at the lower end of the holder 2'. The holder is positioned with the help of the ring 3' or an equivalent member in the various step of machining and mounting by which the heads are built up and machined. For this purpose a reference surface for the holder 2', e.g. 8', is first machined with great accuracy parallel to the axis. The halves of the magnetic core bearing against this reference surface are so machined and adjusted that the tip of the head, taking into account the pole pieces and the addition for subsequent machining, is so located that this location corresponds to the ultimate distance $x$ from this axis. The machined halves of the head are placed into the holder 2'. The desired distance between the two head halves, which forms the head gap, is predetermined producing by evaporation of silicon oxide a layer thereof on the gap surfaces. The two head halves prepared in the manner described are pressed one against the other. This can be effected by means of a screw 9'; the bifurcated magnetic head holder 2' may also be made resilient, so that the halves of the head are secured between the surfaces of the fork by elastic clamping.

After the assembly of the head and the relative adjustment of the halves of the head, the head tips are machined in a jig which again is equipped with a locating ring equivalent to ring 3'. The outer surface of the head is first roughly ground and finely lapped to the exact distance $x$.

If the heads machined in this manner and assembled with their holders 2' are mounted on the head wheel 1 with the help of the locating ring 3', the described construction and process of manufacture ensures that in the heads mounted on the head wheel the gaps also are oriented exactly radially and that the distance $x$ of the polished surfaces of the heads from the axis is maintained with the necessary high accuracy and is not altered and does not alter even during the adjustment of the angular spacing of the heads by means of the conical head screws 6' and 7'.

The construction of the head tips in accordance with the invention may be seen from FIGURE 6 and 6*a*. The supporting surface of the pole pieces 11' has a semicircular cross-section, corresponding to a half-round groove of the magnetic core 12' as can be seen from FIG. 6. Thus after attaching the pole pieces 11' to the core members 12' their correct position is ensured; in addition whereby the size of the contact surfaces between the halves of the magnetic core 12' and the pole pieces 11' is increased and thus a more secure mounting of the pole pieces preferably secured by adhesive, is obtained. To protect the tips of the halves 12' of the magnetic core against deformation and to make possible a perfectly flat grinding of the gap surfaces, spacing pieces 10' of ceramic material may be placed between the core halves 12' (FIG. 6*a*). The distance between the pole pieces 11', which constitutes to the head gap, is maintained by a thin layer 11'' of 1–2$\mu$ thickness of silicon oxide, which fills the head gap and thus prevents clogging of the gap by iron oxide particles abraded from the tape.

In order as far as possible to concentrate the magnetic flux in the head tips and thus to obtain effective for cooperation with the tape, it is advisable to widen the gap by tapering it at 11''' very close to the point of contact with the tape, the ceramic filling pieces 10' also having a corresponding taper 10''. The gap depth is kept only as large as corresponds to the permissible wear, e.g. 0.1 mm.

In FIGURE 7, 1 is the head wheel in schematic illustration and 6 the concave guide, which in its working position gives to the tape 18 a cupped condition matching the circular path of the head tips. In the FIGURE 7 the guide 6 is shown in its position remote from the head wheel 1. In accordance with the invention the concave guide 6 is secured to a slide member 7, which can be shifted together with the guide 6 in an appropriate guide block 8 parallel to itself and in a direction perpendicular to the head wheel axis. In this manner the stroke of the movement of guide 6 can without difficulty be made so large without deleteriously affecting the accuracy of the working position of the concave guide 6 that during rewind when guide 6 is in the illustrated remote position the tape 18 can move freely in flat condition as indicated in FIG. 7 between the head wheel 1 and the concave guide 6, and there is no necessity to bend the tape by means of the concave guide also during the rewind with the risk of abrading and retarding it.

The described construction of the concave guide 6 yields the further advantage that the connection and control for the application of suction to the tape can be effected without movable connections. The vacuum in the vacuum space 19 of the the concave guide 6 is produced by pumping through the channel 20, which in the working position of guide 6 communicates with the bore 22 in the guide block 8 and thus connects the vacuum space 19 with the vacuum connection 22.

In the inoperative or remote position of the concave guide 6 the channel 20 registers with another opening 23 in the guide block 8 and in connection with the external air, so that the external air can enter into the vacuum space 19 and release the magnetic tape 18. The movement of the concave guide 6 may in known manner be effected by an electro-magnet (not shown), which in accordance with the requirements of operation moves the concave guide 6 toward the head wheel 1 or removes it from the latter. The fine adjustment of the distance between the guide 6 and the circular path of the head tips is effected by means of an eccentric 24 acting as a stop in the working position of guide 6, preferably by means of a remote controlled or automatic servomechanism.

As shown in FIGURES 8*a, b, c, d,* an additional convex guide 25 may be provided, which moves relative to the wheel 1 in opposite direction to the movement of the concave guide 6 and has the effect that as the guide 6 approaches the head wheel 1 the magnetic tape is already given approximately the correct curvature, so that it is already urged into the guide 6 and held by motion therein, before the head wheel, or rather the head tips, rub against the tape.

The movement of the convex guide 25 can be derived from the movement of the concave guide 6. For this purpose a pin 26 is mounted on the guide 6 as shown, sliding on a cam portion 27 of the convex guide 25. The cam edge has such a curvature, that the tape is pressed by the convex edge of guide 25 against the concave guide 6 only when the guide 6 is near its working position. In the FIGURES 8*a* to *d* four phases of the movement are shown. In FIGURE 8*a* the guide 6 has the greatest distance from the head wheel 1, so that the tape can pass freely between the head wheel 1 and the guide 6 as shown in FIG. 7. When moving the guide 6 (FIG. 8*b*) in the direction toward the head wheel 1, the guide 25 is tilted so that the tape will be engaged by guide 25 before contacting the head wheel. In consequence of the resulting transverse curvature the tape will be sucked into the corresponding curvature of the concave guide 6 (FIGURE 8*c*). The guide 25 is finally retracted again from the tape, when the working position of guide 6, corresponding to FIGURE 8*d* is reached. Thus the entire width of the tape is brought at the same time in contact with the heads carried by the rotating wheel and an inconvenient wear in the center region of the tape is avoided.

What is claimed as new and desired to be secured by Letters Patent is:

1. In a recorder for magnetically recording video signals on a magnetizable tape, in combination, an electromagnetic head assembly comprising a rotary wheel member and a plurality of electromagnetic head means mounted on said wheel member and adjustable in circumferential direction to uniform angular spacing between said head means, each of said head means comprising an electromagnetic head and mounting means for holding said head on said wheel member, said mounting means being adjustably mounted on said wheel member; adjusting means for each of said mounting means for changing the position of each of said mounting means on said wheel member in circumferential direction independent from the other mounting means, said adjusting means for each of said mounting means comprising a pair of screws threaded in axial direction into said wheel member and having conical portions bearing against opposite edges of said mounting means, respectively, so that by turning said screws in opposite directions the particular mounting means is shifted on said wheel in circumferential direction thereof; and support means for rotatably supporting said wheel member.

2. An arrangement as claimed in claim 1, wherein each of said electromagnetic heads comprises two core halves of magnetizable material, and wherein each of said mounting means has at its outer end two arm portions resiliently embracing said core halves so as to hold them firmly in contact with each other.

3. An arrangement as claimed in claim 2, wherein each of said electromagnetic heads comprises a pair of pole pieces mounted at the outer ends of said core halves, respectively, each of said core halves having a semi-circular groove at its outer end, and each of said pole pieces having an inner end portion of semi-circular cross-section, said pole pieces being attached to said core halves, respectively, with said inner end portions in engagement with said semi-circular grooves, respectively.

4. In a recorder for magnetically recording video signals on a magnetizable tape, in combination, an electromagnetic head assembly comprising a rotary wheel member and a plurality of electromagnetic head means mounted on said wheel member and adjustable in circumferential direction to uniform angular spacing between said head means, each of said head means comprising an electromagnetic head and mounting means for holding said head on said wheel member, said mounting means being mounted on said wheel member adjustable in circumferential direction; centering means for positioning said mounting means on said wheel member in such a manner that the outer tips of all said heads are at a uniform radial distance from the axis of rotation of said wheel member, said centering means comprising an annular member mounted on said wheel member concentrically with said axis of rotation and each of said mounting means having an arcuate recess engaging said annular member; adjusting means for each of said mounting means for independently changing the position of each of said mounting means on said wheel member in circumferential direction along said annular member so that during adjustment of the respective mounting means in circumferential direction the radial distance of the tip of the head mounted thereon from the axis of rotation of the wheel member will be maintained; and support means for rotatably supporting said wheel member.

5. An arrangement as claimed in claim 4, wherein said wheel member is provided with an annular groove concentric with said axis of rotation and dimensioned to receive said annular member.

6. An arrangement as claimed in claim 5, including means for holding said mounting means in engagement with said annular member and with said wheel member.

7. An arrangement as claimed in claim 6, wherein said adjusting means comprise for each of said mounting means a pair of screws threaded in axial direction into said wheel member and having conical portions bearing against opposite edges of said mounting means, respectively, so that by turning said screws in opposite directions the particular mounting means is shifted in circumferential direction of said wheel member.

References Cited by the Examiner

UNITED STATES PATENTS

| | | | |
|---|---|---|---|
| 2,711,945 | 6/1955 | Kornei | 179—100.2 |
| 2,921,990 | 1/1960 | Ginsburg | 179—100.2 |
| 2,998,495 | 8/1961 | Maxey | 179—100.2 |
| 3,020,359 | 2/1962 | Pfost | 179—100.2 |
| 3,043,919 | 7/1962 | Tannenbaum et al. | 179—100.2 |
| 3,046,359 | 7/1962 | Warren | 179—100.2 |

FOREIGN PATENTS

| | | |
|---|---|---|
| 807,725 | 7/1951 | Germany. |

IRVING L. SRAGOW, *Primary Examiner.*

NEWTON N. LOVEWELL, BERNARD KONICK, *Examiners.*